Dec. 19, 1967    B. C. PETTY ETAL    3,358,763
LIQUID NITROGEN IN WELL OPERATIONS
Filed Nov. 27, 1964

INVENTORS.
Billy C. Petty
Alfred R. Hendrickson
Lloyd S. Brown

ATTORNEY

United States Patent Office 3,358,763
Patented Dec. 19, 1967

3,358,763
LIQUID NITROGEN IN WELL OPERATIONS
Billy C. Petty, El Dorado, Ark., and Alfred R. Hendrickson and Lloyd S. Brown, Tulsa, Okla., assignors to The Dow Chemical Company, Midland, Mich., a corporation of Delaware
Filed Nov. 27, 1964, Ser. No. 414,283
3 Claims. (Cl. 166—42)

ABSTRACT OF THE DISCLOSURE

Liquid nitrogen and a well-treating liquid (including aqueous cement slurries and drilling fluids as well as work-over, fracturing, and acidizing fluids) are mixed while the nitrogen is still liquid, and thereafter the nitrogen rapidly become a gas accompanied by a marked cooling of the treating liquid. The nitrogen is injected by use of a novel apparatus as described.

---

Figure 1:
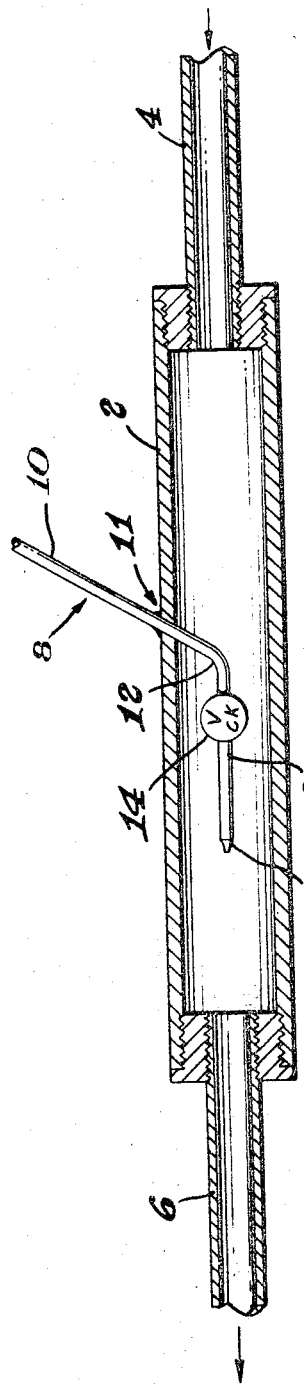

The invention is concerned broadly with the use of a compressible medium in drilling a well or in the treatment of a well penetrating a subterranean formation, hereinafter either operation being sometimes referred to, broadly, by the term "well operation." The term, as used herein, includes drilling employing either a liquid or a gas drilling fluid; extending or directing the passageways, cracks, or fissures in such formation as by acidizing, hydraulic fracturing, and discharging explosive and hypergolic mixtures therein; working or reworking a well such as perforating, repairing, extending, or adjusting casing; setting, moving, or removing packers; cleaning out a well including removal of hydrocarbon depositions, e.g. paraffin; coring and obtaining test samples of formation; fishing jobs; loosening of stuck or plugged tools; reducing formation sloughing and swelling; correcting lost circulation; inhibiting corrosion; pressure testing of tubing or casing; demulsifying formation fluids; well logging; cementing casing in place and squeeze cementing; water shut-off employing hydraulic cements, self setting resinous composition, and materials for bonding formation particles; water flooding and other secondary recovery processes. The term "operating liquid" is usually used herein to refer to the treating or drilling liquid used in any well operation of which the above are illustrative.

The invention is more specifically concerned with the use of elemental nitrogen in conjunction with a liquid in well operations.

The employment of a compressible medium of the nature of a gas which can be safely converted to a liquid at the earth's surface, brought to the site of use as a liquid and these subjected to a positive gasifying step, as by passing it through a heat exchanger and thence to the wellhead for use in a well operation, is known.

Numerous advantages have been shown to ensue when a liquefiable gas is employed in such manner. Outstanding among such advantages are: obtention of better formation test samples (not contaminated nor diluted); forcing treating liquid into a formation by pressurizing it with a gas; use of a gas in a well treating liquid which provides a "fluid spring" whereby the gas, compressed at injection pressures, subsequently expands upon lessening of pressure, thereby providing for appreciable quantities of the treating liquid to flow back out of the well, particularly from remote portions of the formation; use of a gas in the perforating abrasive stream employed during hydraulic casing perforations and other abrasive operations; providing more rapid removal of spent acids and other treating liquids from a treated formation thereby dispensing with much if not all swabbing that is customarily required; reducing drilling mud weight to help solve lost circulation problems by admixing a gas with the mud to reduce its weight; to provide an acid medium in cementing casing where a gasified mud is first injected into the annular space behind the casing prior to the injecting of the cement slurry; and use of a gas as the medium to displace corrosion inhibitors.

Heretofore, elemental nitrogen, when employed in well operations with a liquid treating composition, was required to be converted to a gas prior to its admixture with the treating composition and prior to its injection into a line leading to the wellhead.

In the practice of the invention liquid nitrogen is injected into a supply line, carrying an operating liquid, leading directly to the wellhead or is injected directly into the well string or casing, entering the supply line, string, or casing and into contact with the operating liquid therein as a liquid. The invention requires that liquid nitrogen and an operating liquid be mixed to create a local zone of contact of the two liquids which rapidly expands whereupon the liquid nitrogen is converted to a gas, greatly lowering the temperature of the entire mass of operating liquid. Sufficient nitrogen is used to provide both a gas phase and liquid phase at the temperature and pressure maintained at the level of treatment but insufficient to freeze or congeal the operating liquid.

Illustrative of the well operations contemplated by the invention, which will be discussed hereinafter in some detail, are acidizing and hydraulic fracturing. Since liquid nitrogen is a cryogenic medium there is a particular advantage inherent in acidizing a formation employing the improvement of the invention, in addition to the advantages pointed out above, viz. that of providing a low-temperature acidizing composition which desirably inhibits the rate of attack on the formation and thereby provides an acidized zone extending a greater distance from the wellbore than is obtained by the use of conventional acidizing.

To carry out acidizing according to the improvement of the invention, a suitable acidizing liquid, e.g. between about 1% and about 35% by weight aqueous solution of HCl, containing between about 0.1% and 1.0% of a corrosion inhibitor, e.g. of the nature of that described in U.S. Patent 3,107,221, is prepared in a suitable container on location or is prepared in a suitable vessel or tank and transported to location. Appropriate injection means, including such equipment as pumps, piping, and flow-control and indicator means, are also provided.

Suitable piping and control means are also provided for liquid nitrogen. The liquid nitrogen is brought on location and positioned conveniently close to the wellhead. Control means preferably includes the jet eductor of the nature of that illustrated in the drawing for controlled introduction of the liquid nitrogen as hereinafter more fully described.

The flow of each of the liquid acidic solution and the liquid nitrogen is then initiated and thereafter controlled to provide the desired temperature and desired ratio for acidizing the formation.

The ratio of liquid nitrogen to acidizing liquid, at the point of injection of the liquid nitrogen, is guided by applying the mathematical expressions hereinafter set out.

To carry out hydraulic fracturing, in accordance with the invention, a suitable fracturing liquid is provided, e.g. clear or gelled water, brine, a suitable oil such as crude oil, Diesel oil, kerosene, or a gelled oil or an emulsion. It advantageously will contain a fluid-loss additive (to lessen the loss of fracturing liquid into the pores of the formation being fractured). Illustrative of a fluid-loss additive for aqueous-base liquids is finely divided pulverulent silica in conjunction with a gum and for use in oil-base liquids is the fluid-loss additive described in the Brown et al. Patent No. 2,779,735. Propping sand may also advantageously be admixed with the fracturing liquid, e.g. 20 to 60 mesh flint sand of the nature of that produced in the vicinity of Ottawa, Ill., for the purpose of propping open the fractures being created.

The flow of each of the hydraulic fracturing liquid and the liquid nitrogen is initiated. The ratio of liquid nitrogen and hydraulic fracturing liquid is thereafter controlled, as in acidizing, by observance of the mathematical expressions hereinafter set forth.

The apparatus of the invention employed in the practice of the method of the invention, which may be referred to as a jet eductor is illustrated in the drawing and comprises: mixing pipe 2; inlet pipe section 4 (for admitting operating liquid), threadedly engaged to the inlet end of the mixing pipe; and outlet pipe section 6 (for discharging the mixed operating liquid and nitrogen) threadedly engaged to the outlet end of the mixing pipe; liquid nitrogen inlet tube 8 which is composed of outer part 10, which passes (in tightly sealing engagement) through hole 11 in the mixing pipe and inner part 12, which is a continuation of part 10 positioned substantially parallel to the direction of flow of an operating liquid in the mixing pipe; unidirectional flow valve 14 (e.g. a check valve) positioned in tube part 12; and nipple 16 provided with aperture or orifice 18 at the discharge end thereof, which is of smaller cross-section than tube parts 10 and 12. Mixing pipe 2 is sometimes referred to herein as a header.

Figure 2:
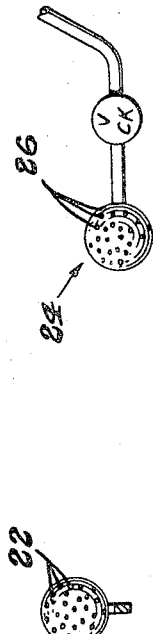
Figure 3:
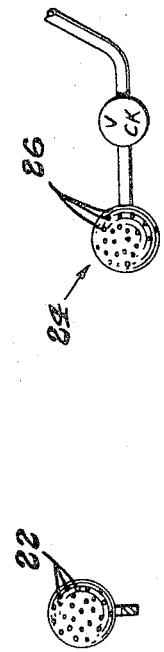
Figure 4:
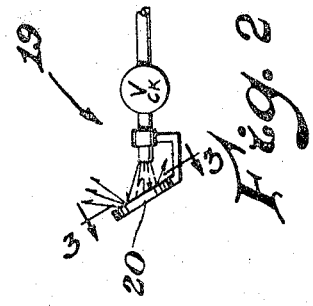

In place of nipple 16 as shown in FIGURE 1, a sparger 19 illustrated by FIGURE 2, having plate 20 positioned at an angle of between about 180° and about 90° at the outlet of tube part 12, may be used. If desired, the sparger of FIGURE 2 may be provided with randomly located substantially equi-spaced apart or scattered openings. FIGURE 3 is a sectional view taken along line 3—3 of FIGURE 2 through which such scattered openings, designated by numeral 22, have been made. In place of either nipple 16 or sparger 19 (with or without openings 22 therein), an arcuate nozzle or spray head 24, as shown in FIGURE 4, containing openings 26 therein, may be secured to the discharge end of tube part 12.

It is understood that instead of aperture 18 or openings of the nature of 22 or 24 in conjunction with check valve 14, a pressure-actuated needle valve may be employed. It is also understood that, instead of threaded engagement, other techniques may be employed to secure pipe sections 4 and 6 to mixing pipe 4, e.g. brazing, sweating, locking, or the like.

Mixing pipe 4 may advantageously, as shown, be of somewhat greater cross-section than inlet pipe section 4 and outlet pipe section 6. However, said pipe sections may be of substantially the same diameter or they may vary in size as desired so long as sufficient operating liquid is admitted into mixing pipe 2 and sufficient mixture of liquid nitrogen and operating liquid is permitted to leave through pipe section 6. The size of the pipes is not highly critical. Mixing pipe 2 may be from about 0.5 to about 4 inches in diameter, a diameter of from about 1 to about 2.5 inches commonly being employed. Liquid nitrogen injection pipe 8 may be from about $\frac{1}{16}$ to about 1 inch in diameter and more commonly is between about $\frac{1}{8}$ and about $\frac{1}{2}$ inch in diameter. The aperture, when employed as the outlet from the liquid nitrogen injection tube, is, as aforesaid, smaller than the injection tube, usually being between about $\frac{1}{16}$ and $\frac{1}{4}$ of the diameter of liquid nitrogen injection outlet tube 2. When a sparger is employed, it is secured at the opening of the liquid nitrogen outlet tube in a position such that it breaks the liquid nitrogen, by impingement thereon, into very small droplets, i.e. atomizes it. If a perforated plate, as illustrated in FIGURE 2 or an arcuate nozzle as illustrated in FIGURE 4, is employed, the holes therein are usually between about $\frac{1}{32}$ and $\frac{1}{16}$ inch in diameter.

The mathematical expressions, to which reference was earlier made, for calculating the ratio of liquid nitrogen to operating liquid are based upon the theoretical temperature conditions and their effect when two liquids of widely differing temperatures are intermixed under the circumstances prevailing during a treatment of a formation according to the invention. A system of two components, one at a low temperature and the other at a relatively high temperature (neglecting heat lost to the pipe and to air and to supporting structure exterior to the pipe), has an equilibrium temperature based on the physical characteristics of the original components.

In the mathematical expressions set out below, the quantity of heat lost by one component (designated $Q_L$), assuming adiabatic mixing, is equal to the quantity of heat gained by the other component (designated $Q_G$), i.e. $Q_L = Q_G$. The unit of heat being used is the British thermal units usually designated hereinafter as B.t.u.

By knowing or determining the physical characteristics of the material to which it is desired to add a cryogenic liquid, a temperature limit can be established which will serve as a basis of calculation. For example, in the use of crude or heavy oils for fracturing, there is a temperature below which the oil becomes too viscous to pump. When in question, this can be predetermined. If the starting temperature of the oil is known, the amount of cryogenic liquid to add per unit volume, to decrease the temperature to a point just above this undesirable viscosity, can be calculated.

As stated above, $Q_L = Q_G$.

$Q_L$ = Heat in B.t.u. required to convert a liquid from $T_1$ to $T_2$, wherein $T_1$ is the starting temperature and $T_2$ is the predetermined final temperature.

$Q_G$ = Heat in B.t.u. required to convert liquid nitrogen at $-320°$ F. to a gas at a temperature $T_2$.

$Q_L$ in B.t.u. is equal to the specific heat, designated Sp. Ht., of the liquid, times the temperature change, in ° F., times the number of pounds of liquid involved or:

$$Q_L = [(\text{Sp. Ht. of the liquid}) (T_1 - T_2) (\text{weight in pounds})]$$

$Q_G$ in B.t.u. is equal to the heat of vaporization, designated $H_V$ of the nitrogen plus the specific heat of the nitrogen gas times the temperature change times the number of pounds of nitrogen or:

$$Q_G = [(H_V + \text{Sp. Ht.})(320 + T_2)][\text{weight of } N_2]$$

The pounds of liquid $N_2$ to add per pound of operating fluid to change the temperature from $T_1$ to $T_2$, $T_1$ being the starting temperature and $T_2$ the predetermined final temperature, as above stated, based on the congealing point of the operating liquid may be calculated as follows:

$$[(85.8 + 0.25)(320 + T_2)] [\text{weight of } N_2] = (\text{Sp. Ht. of liquid})(T_1 - T_2)(\text{weight of liquid})$$

or it may be more simply written:

Number of pounds of $N_2$ per pound of $$\text{operating liquid} = \frac{\text{Sp. Ht. }(T_1 - T_2)}{165.8 + (0.25 T_2)}$$

In the above equation 85.8 represents the heat of vaporization, designated $H_V$, of nitrogen and 0.25 represents the value of specific heat of gaseous nitrogen.

The weight percent of the nitrogen present can then be calculated as below:

Wt. percent of $N_2 =$ $$\left( \frac{\text{Weight of } N_2}{\text{Weight of } N_2 + \text{Weight of operating liquid}} \right) 100$$

If the fluid used is water, the foregoing formula can be modified to determine the amount of liquid nitrogen to add before all of the water is converted to ice.

$Q_L$ and $Q_G$ may now be defined as follows:

$Q_L$=Heat in B.t.u. necessary to convert the $H_2O$ at temperature $T_1$ to ice at 32° F.

$Q_G$=Heat in B.t.u. necessary to convert the liquid $N_2$ at —320° F. to gas at 32° F.

Since, as aforestablished, $Q_L = Q_G$, then $Q_L$=[Heat of fusion, designated $H_F$, of $H_2O$+Sp. Ht. of $H_2O$)(original temperature of $H_2O$ —32)][weight of $H_2O$].

Accordingly, $Q_L$=[(142.5+1)($T_1$—32)](weight of $H_2O$);

$Q_G$=[(Heat of vaporization of $N_2$)+(Sp. Ht. of $N_2$ Gas)(320+final temperature of $N_2$ gas)] [weight of $N_2$]; and $Q_G$=[(85.5+0.25)(320+32)] [weight of $N_2$].

In the above equation, 142.5 represents the value of the $H_F$ of water and 1 represents the value of specific heat of water.

Therefore, the amount in pounds, of liquid $N_2$ at —320° F., i.e. the boiling temperature of $N_2$, that could be added per pound of $H_2O$ at temperature $T_1$ to give ice at 32° F. would be:

[(85.8+0.25)(320+32)] [weight of $N_2$]=
[(142.5+1)($T_1$—32)] [weight of $H_2O$]

or (173.8)(weight of $N_2$)=
[(142.5+($T_1$—32)] [weight of $H_2O$]

The number of pounds of $N_2$ per pound of $H_2O$ =

$$\frac{110.5 + T_1}{173.8}$$

The weight percent of the $N_2$=

$$\left(\frac{\text{Weight of } N_2}{\text{Weight of } N_2 + \text{weight of water}}\right)100$$

By observance of the above limits, the invention may be practiced without danger of congealing the liquid hydrocarbon when such is employed or of freezing the aqueous liquid when such is employed. It is to be borne in mind that brines, however, permit a lower temperature before freezing than water, such values being readily obtainable by reference to a standard handbook. It is recommended that the amount of liquid nitrogen introduced be maintained somewhat less than the value obtained by calculation to provide a margin of safety. However, in usual practice the nitrogen and operating fluid mixture is used at a pressure greater than one atmosphere. Since increased pressures lower the freezing temperature, this provides an additional margin of safety.

To show that liquid nitrogen can be satisfactorily injected directly into a stream of water, the following examples were run.

*Example one*

Water was passed through a 2½-inch diameter mixing pipe, 30 inches in length, of the nature of that identified as item 2 in the drawing. The initial water temperature was 75° F. The pressure on the water was 1000 pounds per square inch gauge (p.s.i.g.). Simultaneously therewith, liquid nitrogen was injected into the water in the mixing pipe through a ⅛-inch (inside) diameter tube of the nature of items 2 and 8, respectively, of the drawing. The nitrogen injection was controlled, by a needle valve, at a rate of 1.1 gallons per minute (equivalent to 103 standard cubic feet). Hereinafter standard cubic feet is abbreviated s.c.f. A positive displacement pump provided pressure for the nitrogen injection. Dial thermometers were installed at about 20-foot intervals in the water pipes leading into and from the mixing pipe. The desired ratio of liquid nitrogen to water was obtained by varying the pumping rate of the water.

The pumping rate of the water in gallons per minute and of liquid nitrogen in s.c.f. per barrel of water, the temperature of the pipe (of the nature of that depicted as item 2 of the drawing), and the drop in temperature from the initial to the lowest temperature observed, are all set forth in Table 1 below for each of two runs.

TABLE I

| Run No. | Fluid pump rate in gallons per minute | Volume ratio s.c.f. of $N_2$ per bbl. of water | Lowest temperature in mixing pipe, ° F. | Temperature drop in Fahrenheit degrees |
|---|---|---|---|---|
| 1 | ¹ 42 | 105 | 30 | 40 |
| 2 | 13 | 319 | 0 to —10 | 75 to 85 |

¹ 1 bbl.

Traces of ice were formed in the pipes during Run No. 2 wherein there was an average drop in temperature of 80 Fahrenheit degrees in the mixing pipe, resulting in the occasional low temperature of —10° F. A temperature somewhat below the freezing temperature of water, may be successfully employed due to the turbulence of flow. However, the appearance of some ice in Run No. 2 indicates that the conditions should be such as to maintain a temperature of not substantially less than about —5° F. or possibly —10° F. at the outlet of the mixing pipe. In a well operation (as broadly defined hereinbefore), it is apparent that all the accompanying advantages of employing nitrogen gas in the downhole operation can be obtained by the practice of the invention plus the added advantages of the reduced temperature and convenience of injecting the nitrogen as a liquid.

*Example two*

An example was conducted similar to that above, except kerosene was employed as the operating liquid, to show the operability of the improvement of the invention when employing a hydrocarbon base liquid. Six individual runs (numbered 3 to 8) were made wherein conditions were varied. The apparatus employed was of the type employed to obtain the results set out in Table I.

Table II below shows the pump rate in barrels per minute for each of the six runs, the amount of nitrogen liquid (calculated in s.c.f.) per barrel of kerosene, and the temperature in the mixing pipe (of the nature of item 4 in the drawing) for each of the runs. The pressure applied to the kerosene was 1000 p.s.i.g. and the initial temperature of the kerosene was 60° F.

TABLE II

| Run No. | Pump rate of kerosene in gallons per minute | Ratio of $N_2$ in standard cubic feet per barrel of kerosene | Temperature in mixing pipe in ° F. | Temperature drop in Fahrenheit degrees |
|---|---|---|---|---|
| 3 | 50 | 86 | 33 | 27 |
| 4 | 40 | 105 | 30 | 30 |
| 5 | 30 | 136 | 28 | 32 |
| 6 | 20 | 211 | 20 | 40 |
| 7 | 10 | 428 | 10 | 50 |
| 8 | 8 | 537 | —5 | 65 |

Reference to the table shows the lowest temperature obtained was —5° F. This was a satisfactory temperature and was unaccompanied by any undesirable increase in the viscosity of the kerosene after admixture of the liquid nitrogen, thus showing that the liquid nitrogen desirably changed to a gas within a sufficient short time after contact with the kerosene to avoid any undesirable gelation of the kerosene.

The following example is illustrative of acidizing in accordance with the practice of the invention.

*Example three*

A fluid-bearing limestone formation penetrated by a wellbore required stimulation of fluid flow. It was decided to acidize the formation. A 15 percent by weight aqueous solution of HCl, containing about 0.5% by weight of an amine-type inhibitor to corrosive attack of an acid on metal, was passed through a mixing pipe (or header) of the type shown as item 2 of the drawing and, concurrently therewith, liquid nitrogen was injected through orifice, of the nature of item 6 of the drawing, positioned at the end of the liquid nitrogen injection tube from whence the resulting chilled nitrogen-HCl acidizing fluid passed into a pipe of the type numbered 6 of the drawing and thence down the wellbore and into the formation.

The ratio of the aqueous HCl solution to the liquid nitrogen was controlled so as to fall within the optimum limits established by the above mathematical expressions. The optimum ratio was in turn largely guided by the rate of acidizing desired and the geometry of the limestone zone of the formation being treated.

After a sufficient amount of the acidizing composition comprising the aqueous acid and the liquid nitrogen had been injected down the wellbore and into the formation to effect acidizing of the formation to the extent desired, the pressure was taken off and the well allowed to flow back. Very little swabbing was required to remove the spent acidic solution because of the presence of compressed gaseous nitrogen in the injected fluid.

The well was put back into production and showed a marked increase in production. One of the reasons accounting for such marked improvement is that acidizing according to the invention, employing a low-temperature acid solution, provides desirably less acidizing in the immediate vicinity of the wellbore and the corollary thereof, more effective acidizing at more remote distances from the wellbore, than is attained by known acidizing methods.

*Example four*

The following example is illustrative of fracturing the formation in accordance with the invention. A stratum of a formation was to be fractured. It was penetrated by a cased wellbore having perforations at the stratum and provided with a 2-inch tubing extending down to the stratum. A packer was positioned in the annulus, defined by the tubing and casing, just above the stratum. Injection was by means of an apparatus described as a jet eductor and of the type depicted in the drawing, having a 5½-inch header, of the nature of the mixing pipe or header identified as item 2 and, provided with an injection means, of the nature of the assembly identified as item 8, and an outlet pipe section leading from the header, comparable to item 6 which was connected to the tubing of the well.

A flow of water into the header was initiated. The water was injected in sufficient quantity and pressure to create a fracture, i.e. break down the formation. This required 10 minutes of injection of water at the rate of 16 barrels per minute. Thereafter, liquid nitrogen was introduced into the fracturing liquid in the amount shown in Table III for each of six successive periods, each period culminating, after a steady rise (but with continued injection until the end of the last run) in a leveling off or dropping off of pressure indicating a fracture. Liquid nitrogen was continued to be pumped for a period of 26 minutes, making a total of injected nitrogen, calculated in s.c.f of 79,200. The pressure changes set out in Table III are a result of fractures being created during treatment.

TABLE III

| Time water was pumped in minutes | Bbls./min. of water | S.c.f. $N_2$ per bbl. water | Temperature in header in ° F. | Injection pressure of water in p.s.i.g. |
|---|---|---|---|---|
| 10 | 16 | [1] None | 48 | 1,800 |
| 3 | 16 | 20 | 48 | 1,800 |
| 4 | 9.5 | 350 | 42 | 1,600 |
| 4 | 5 | 700 | 40 | 1,500 |
| 5 | 3 | 1,150 | 38 | 800 |
| 2 | 5 | 700 | 40 | 1,500 |
| 8 | 5 | 700 | 42 | 1,500 |

[1] Breakdown.

The temperatures recorded show that the temperature of the water was maintained well above freezing. Following treatment and release of pressure on the well, substantially all of the fracturing water flowed out of the well due to the compressed nitrogen gas forced down the well and into the formation during treatment.

Reference to the pressures recorded during the example, as set out in Table III, shows that the controlled injection of liquid nitrogen directly into an operating liquid employed in well operations, wherein the temperature of the resulting mixture is maintained above that which objectionably impairs the flow characteristics thereof in accordance with the method and apparatus of the invention, and in an amount sufficient to insure both gas and liquid phases, provides all the known advantages resulting from the use of gaseous nitrogen accompanied by the advantages of introducing the nitrogen as a liquid into the operating liquid as it is being pumped to the well being treated.

Having described my invention what we claim and desire to protect by Letters Patent is:

1. In a well operation wherein an operating liquid is injected down a well penetrating a stratum of a subterranean fluid-bearing formation to be treated at sufficient pressure to force the liquid into contact with the stratum, to effect an improvement in the obtention of the fluid from the formation therein, the improvement consisting essentially of chilling the liquid and thence the formation contacted thereby by injecting liquid nitrogen into the operating liquid at a rate such that the temperature of the operating liquid is desirably lowered but which does not adversely affect the flow characteristics of the operating liquid, and to create temporarily a mixture of liquid nitrogen and the operating liquid and subsequently to convert the nitrogen liquid to a gas phase in the operating liquid phase at the conditions existing at the stratum being treated, and forcing the resulting nitrogen-operating liquid mixture down the well and into contact with said stratum at a pressure and for a time sufficient to effect improvement in said stratum, and thereafter discontinuing injection and releasing the pressure from the well.

2. In the method of acidizing a stratum of a subterranean formation penetrated by a well employing an aqueous acidic solution, the improvement consisting essentially of injecting liquid nitrogen into said aqueous acidic solution at a rate such that the temperature of the acidic solution is desirably lowered for a more controlled and effective acid attack on the formation but at a temperature which is maintained above the freezing point of the acidic solution in sufficient amount to create a gas phase and a liquid phase at the stratum being acidized, and at sufficient pressure to force the resulting nitrogen-acidic solution mixture into contact with the stratum to be acidized, retaining said mixture in contact therewith for a time sufficient for the acidic solution to attack, chemically, at least portions of the stratum reactive therewith discontinuing said injection, and releasing pressure from said well.

3. In the method of fracturing a stratum of a formation penetrated by a well employing an operating liquid to exert hydraulic pressure to and in the stratum, the improvement consisting essentially of injecting liquid nitrogen into said operating liquid at a rate such that the temperature of the operating liquid is desirably lowered but which does not adversely affect the fluid characteristics of the operating liquid in an amount sufficient to provide a mixture comprising a gas phase and a liquid phase at the stratum being fractured and at a pressure on the resulting nitrogen-operating liquid mixture which is sufficiently great to force said mixture into contact with the stratum to effect fractures therein, releasing the pressure from the well, and allowing a substantial portion of the nitrogen-operating liquid to flow out of the well under the effect of the compressed nitrogen gas therein.

(References on following page)

References Cited

UNITED STATES PATENTS

| | | | |
|---|---|---|---|
| 2,772,737 | 12/1956 | Bond | 166—22 |
| 2,905,444 | 9/1959 | Shepard | 175—17 |
| 3,097,691 | 7/1963 | Smith | 166—28 |
| 3,100,525 | 8/1963 | Smith | 166—42 X |
| 3,100,528 | 8/1963 | Plummer | 166—42 |
| 3,170,517 | 2/1965 | Graham | 166—42 |

CHARLES E. O'CONNELL, *Primary Examiner.*

NILES C. BYERS, *Examiner.*